United States Patent
Norn

(10) Patent No.: US 10,472,471 B2
(45) Date of Patent: Nov. 12, 2019

(54) MASTERBATCH COMPRISING COLORANT PARTICLES AND A POLYOL POLY(HYDROXY FATTY ACID) ESTER AS DISPERSING AGENT

(71) Applicant: EINAR A/S, Juelsminde (DK)

(72) Inventor: Viggo Creemers Norn, Stouby (DK)

(73) Assignee: EINAR A/S (DK)

( * ) Notice: Subject to any disclaimer, the term of this patent is extended or adjusted under 35 U.S.C. 154(b) by 57 days.

(21) Appl. No.: 15/557,291

(22) PCT Filed: Mar. 10, 2016

(86) PCT No.: PCT/EP2016/055079
§ 371 (c)(1),
(2) Date: Sep. 11, 2017

(87) PCT Pub. No.: WO2016/142447
PCT Pub. Date: Sep. 15, 2016

(65) Prior Publication Data
US 2018/0057643 A1    Mar. 1, 2018

(30) Foreign Application Priority Data
Mar. 10, 2015  (EP) .................................... 15158437

(51) Int. Cl.
| | | |
|---|---|---|
| *C08J 3/12* | (2006.01) | |
| *C08J 3/20* | (2006.01) | |
| *C08J 3/22* | (2006.01) | |
| *C08L 23/02* | (2006.01) | |
| *C08L 23/08* | (2006.01) | |
| *C08L 23/10* | (2006.01) | |
| *C08K 5/00* | (2006.01) | |
| *C08K 5/103* | (2006.01) | |
| *C08L 23/04* | (2006.01) | |
| *C08K 3/22* | (2006.01) | |

(52) U.S. Cl.
CPC ................ *C08J 3/203* (2013.01); *C08J 3/12* (2013.01); *C08J 3/226* (2013.01); *C08K 5/0091* (2013.01); *C08K 5/103* (2013.01); *C08L 23/02* (2013.01); *C08L 23/04* (2013.01); *C08L 23/0815* (2013.01); *C08L 23/0869* (2013.01); *C08L 23/10* (2013.01); *C08J 2300/22* (2013.01); *C08J 2323/08* (2013.01); *C08J 2323/12* (2013.01); *C08J 2400/22* (2013.01); *C08J 2423/08* (2013.01); *C08J 2423/12* (2013.01); *C08K 2003/2241* (2013.01)

(58) Field of Classification Search
CPC ... C08J 3/203; C08J 3/12; C08J 3/226; C08K 5/103; C08K 5/0091; C08L 23/02; C08L 23/04; C08L 23/0815; C08L 23/0869; C08L 23/10
USPC ........................................................ 523/351
See application file for complete search history.

(56) References Cited

U.S. PATENT DOCUMENTS

| | | | |
|---|---|---|---|
| 5,604,279 A | 2/1997 | Bernhardt et al. | |
| 6,316,547 B1 * | 11/2001 | Varlet | C08J 3/226 525/191 |
| 8,101,707 B2 * | 1/2012 | Tenore | A23D 7/013 528/275 |
| 2008/0319123 A1 | 12/2008 | Haubennestel et al. | |
| 2018/0265713 A1 * | 9/2018 | Norn | C09D 5/027 |

FOREIGN PATENT DOCUMENTS

| | | |
|---|---|---|
| EP | 0266676 A2 | 5/1988 |
| EP | 0799855 B1 | 10/2002 |
| JP | 3274183 B2 | 2/2002 |
| WO | WO 98/01498 A1 | 1/1998 |

OTHER PUBLICATIONS

Encyclopedic Dictionary of Polymers, Editor, Jan W. Gooch, Springer, New York, NY, p. 109 (2007).
International Search Report and Written Opinion for related International Application No. PCT/EP2016/055079, dated May 31, 2016, 11 pages.

* cited by examiner

*Primary Examiner* — Hannah J Pak
(74) *Attorney, Agent, or Firm* — Brinks Gilson & Lione; Ryan L. Marshall

(57) ABSTRACT

The present invention relates to a masterbatch comprising colorant particles, a polyol poly(hydroxy fatty acid) ester dispersing agent and a carrier resin. The masterbatch is used for coloring thermoplastic polymer compositions. The present invention also relates to a method for producing said masterbatch, a colored thermoplastic polymer composition comprising said masterbatch and colored thermoplastic products formed of said colored thermoplastic composition.

13 Claims, 5 Drawing Sheets

MASTERBATCH COMPRISING COLORANT PARTICLES AND A POLYOL POLY(HYDROXY FATTY ACID) ESTER AS DISPERSING AGENT

FIELD OF THE INVENTION

The present invention relates to a masterbatch comprising colorant particles, a polyol poly(hydroxy fatty acid) ester dispersing agent and a carrier resin. The masterbatch is used for coloring thermoplastic polymer compositions. The present invention also relates to a method for producing said masterbatch, a colored thermoplastic polymer composition comprising said masterbatch and colored thermoplastic products formed of said colored thermoplastic composition.

BACKGROUND

Processes for coloring of thermoplastic polymers are well known. The colorants used for coloring the thermoplastics can be either pigments or dyes. Pigments are organic or inorganic particles that are insoluble in polymers. Dyes are organic liquids that are soluble in the plastic.

A masterbatch is a concentrate of pigments dispersed into a carrier resin. Masterbatches are used to color plastics by adding the masterbatch to the plastic to be colored prior to or during the coloring process. Known masterbatches generally include a colorant, a dispersing agent, a carrier resin, which is typically a thermoplastic polymer, and optionally one or more additives. Masterbatches are often used because they provide better colorant dispersion than neat colorant.

The most commonly used dispersing agents known in the art are metal soaps, such as calcium stearate, zinc stearate, magnesium stearate, aluminium stearate and ethylene bis-stearamide (EBS) wax.

It is known that migration problems can arise when dispersing agents are used in the process of coloring thermoplastics. This problem is most likely to occur during coloring of very non-polar plastics, such as for example polyethylene and polypropylene, where the more polar dispersing agents tend to migrate to the surface. Such migration causes problems in form of non-uniform coloring of the plastic.

Known masterbatches have a relatively low colorant concentration, because larger concentrations result in insufficient dispersion of the colorant particles.

Insufficient dispersion of colorant particles can lead to uneven coloring of the polymers and color spots due to non optimal distribution of the pigment particles. Insufficient dispersion of colorant particles can also lead to a decrease in physical and mechanical properties of the end product, such as tensile strength, flexural modulus, elongation and impact strength. Additional problems caused by insufficient dispersion include thread breakage during spinning and clogging filters of melt spinning equipment.

US 2008/0319123 describes a polyester, which contains carboxy groups, for use as a dispersing agent in pigment concentrates for coloring of thermoplastics. The document also describes masterbatches comprising pigments, thermoplastics and said polyester.

U.S. Pat. No. 5,604,279 relates to a colorant preparation, which can be used for producing masterbatches or for the direct coloration of plastics. The colorant composition contains 60-90% by weight of an organic or inorganic pigment, 5-39% by weight of an amorphous poly-alfa-olefin and 0.1-10% by weight of a free-flow agent. The free-flow agent is silica, preferably pyrogenic silica, chalk, a silicate, preferably an aluminium silicate, a sodium silicate, a sodium aluminium silicate or a calcium silicate, or a polyol ester of a long-chain fatty acid, oleamide or a partial fatty acid glyceride.

JP 3274183 discloses a dispersant for a coloring agent. The coloring agent is a mixture of dispersant in a pigment. The dispersant comprises an ester formed from a condensed hydroxy fatty acid having a degree of condensation of at least 2 or greater and a polyhydric alcohol having 4 or more hydroxyl groups as an essential component. The document is not concerned with masterbatches for coloring of thermoplastic polymers, nor does the document discuss the problem of providing an even distribution of colorant pigments in a masterbatch.

EP 0799855 describes a filler-containing thermoplastic resin composition having good flowability and toughness and improved impact strength, bending strength and other mechanical properties and heat stability. The document does not relate to a composition, such as for example a masterbatch, for coloring of thermoplastic polymers.

SUMMARY OF THE INVENTION

The present inventors have discovered that polyol poly (hydroxy fatty acid) esters provide a surprisingly improved colorant dispersing effect of colorant particles in the colored thermoplastic products when used as dispersing agents in the process of coloring thermoplastic polymers. This finding opens up for new types of masterbatches which are more convenient to use because colored products having a more uniform color distribution and thereby also a better color saturation can be produced. Moreover, the concentration of colorant in the thermoplastic product may be reduced because of the improved colorant dispersion whereby a markedly cost reduction is achieved. The inventors have also observed that the surface of the colored products is more uniform and shiny as compared to products where a conventional dispersing agent has been used.

The inventors have also found that the presence of the polyol poly(hydroxy fatty acid) ester dispersing agent reduces the viscosity of the melted thermoplastic polymer composition during processing. This discovery makes it possible to either perform the extrusion or molding process at a lower temperature and/or pressure or to increase the flow rate of the extrusion or molding process.

Thus, a first object of the present invention is directed to a masterbatch for coloring of thermoplastic polymer compositions, said masterbatch comprising a colorant in a total amount of 10-50% (w/w) relative to the total weight of the masterbatch, a dispersing agent in a total amount of 0.5-20% (w/w) relative to the total weight of the masterbatch and a carrier resin in a total amount of 30-80% (w/w) relative to the total weight of the masterbatch, wherein the dispersing agent is a polyol poly(hydroxy fatty acid) ester (pphe dispersing agent).

In a second aspect the present invention is directed to a method for producing the masterbatch, said method comprises the steps of:
  a) providing a pphe dispersing agent, a colorant, a carrier resin and optionally one or more additive(s), and
  b) mixing the pphe dispersing agent, the colorant, the carrier resin and additives, if any, so as to form the masterbatch.

In a third aspect, the present invention is directed to a thermoplastic polymer composition comprising the masterbatch of the present invention.

In a fourth aspect, the present invention is directed to a method of producing a colored thermoplastic product wherein the method comprises the steps of:
i) providing a masterbatch of the present invention and one or more thermoplastic polymer(s),
ii) mixing the masterbatch and said one or more thermoplastic polymer(s), so as to form a colored thermoplastic polymer composition, and
iii) processing the colored thermoplastic polymer composition obtained in step b into a desired shape so as to form the colored thermoplastic product,

DETAILED DESCRIPTION OF THE INVENTION

Thus, an aspect of the invention pertains to a masterbatch comprising a colorant in a total amount of 10-50% (w/w) relative to the total weight of the masterbatch, a polyol poly(hydroxy fatty acid) ester dispersing agent (pphe dispersing agent) in a total amount of 0.5-20% (w/w) relative to the total weight of the masterbatch, a carrier resin in a total amount of 30-80% (w/w) relative to the total weight of the masterbatch and optionally one or more additive(s).

In the context of the present invention the term "polyol poly(hydroxy fatty acid) ester dispersing agent" or "pphe dispersing agent" relates to polyol poly(hydroxy fatty acid) esters which are soluble or partly soluble in lipophilic solvents such as vegetable oils like sunflower oil, aromatic solvents like xylene, and/or alcohols such as 2-propanol, and have dispersing or emulsifying properties.

Figure 1:
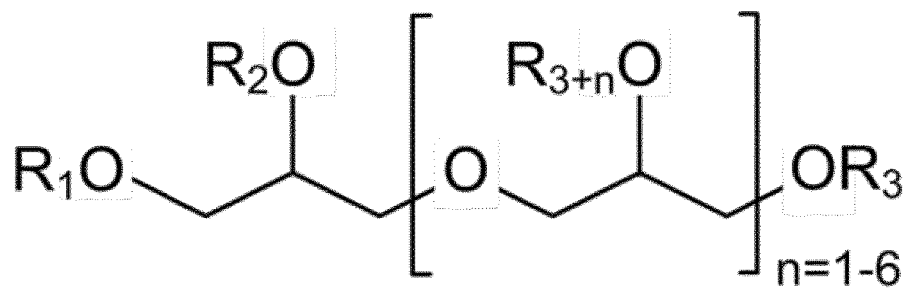
FIG. 1 shows the general formula of an example of a pphe molecule.
Figure 2A:
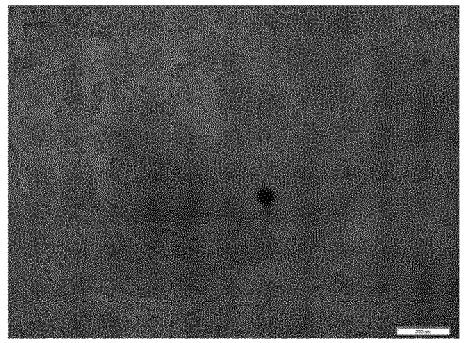
FIGS. 2a and 2b: LLDPE with 40% Heliogen Blue and 10% PGPR Palsgaard 4150 added as 1% masterbatch to casted oblate and 0.5% to film.
Figure 2B:
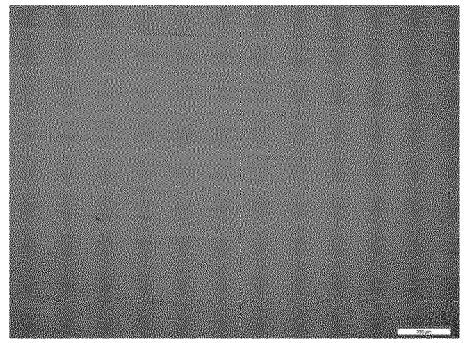
Figure 3A:
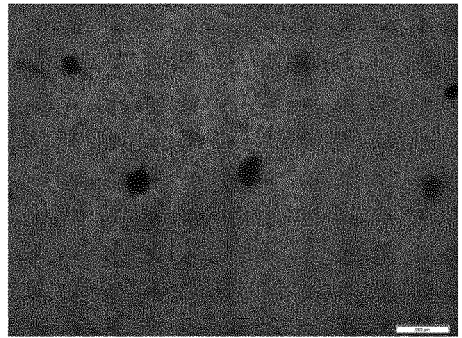
FIGS. 3a and 3b: LLDPE with 40% Heliogen Blue and 5% PGPR Palsgaard 4150 added as 1% masterbatch to casted oblate and 0.5% masterbatch to film.
Figure 3B:
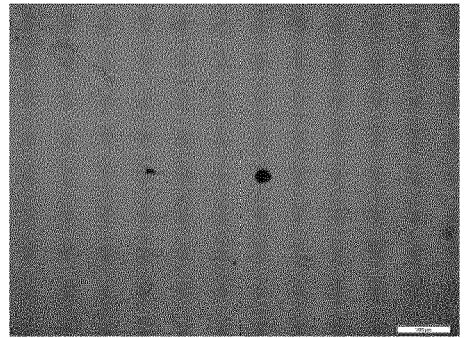
Figure 4A:
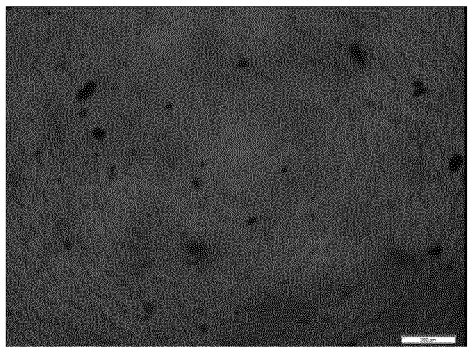
FIGS. 4a and 4b: LLDPE with 40% Heliogen Blue and 5% Abril 1041 wax added as 1% masterbatch to casted oblate and 0.5% masterbatch to film.
Figure 4B:
Figure 5A:
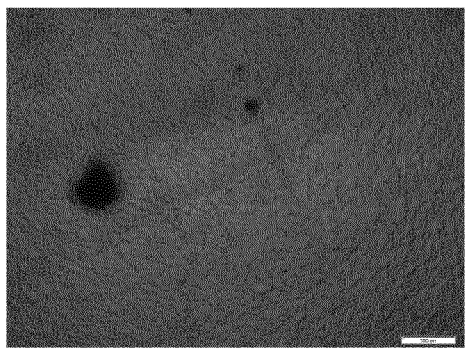
FIGS. 5a and 5b: PPDPE with 40% Heliogen Blue and 10% PGPR Palsgaard 4150 added as 1% masterbatch to casted oblate and 0.5% to film.
Figure 5B:
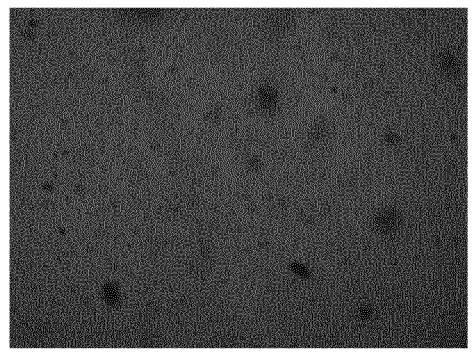
Figure 6A:
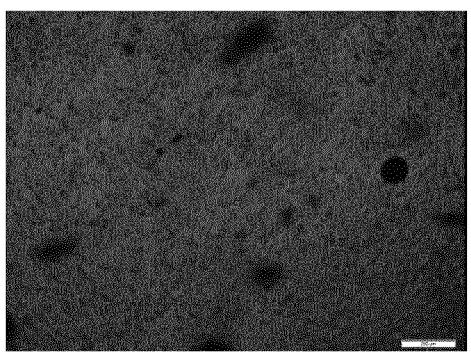
FIGS. 6a and 6b: EMA with 40% Heliogen Blue and 10% PGPR Palsgaard 4150 added as 1% masterbatch to casted oblate and 0.5% to film.
Figure 6B:
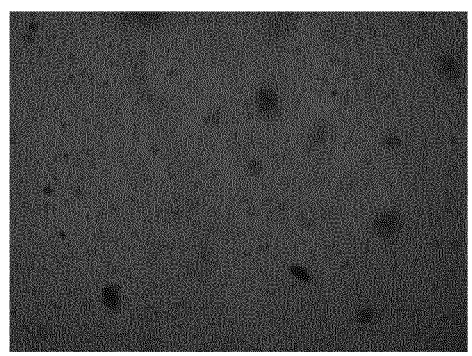
Figure 7A:
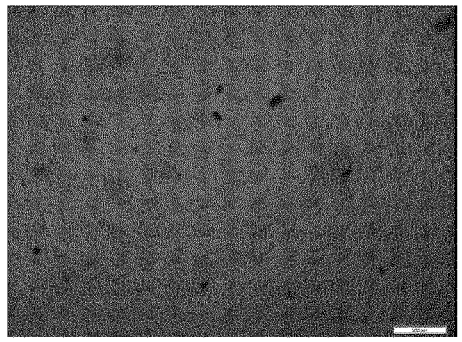
FIGS. 7a and 7b: EMA with 40% Heliogen Blue and 10% Abril 1041 wax added as 1% masterbatch to casted oblate and 0.5% to film.
Figure 7B:
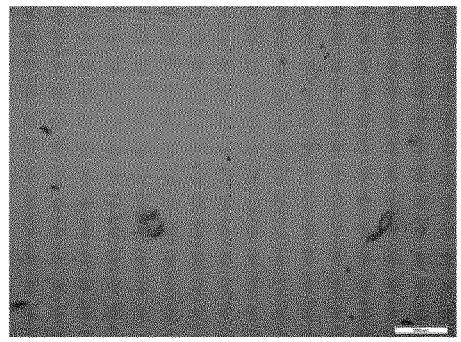

A schematic embodiment of a polyol poly(hydroxy fatty acid) ester is shown in FIG. 1, where the backbone is a poly(glycerol) containing from 2-7 linked glycerol molecules and the groups $R_1$, $R_2$, $R_3$ and $R_{3+n}$ are, independently, either hydrogen or poly(hydroxy fatty acid), such as e.g. polyricinoleate, which are attached to the backbone by esterification. It should be noted that a polyol poly(hydroxy fatty acid) ester can contain more than one poly(hydroxy fatty acid), such as e.g. two poly(hydroxy fatty acid)s, three poly(hydroxy fatty acid)s, four poly(hydroxy fatty acid)s or even more.

The pphe dispersing agent used in the present invention may contain a single species of polyol poly(hydroxy fatty acid) ester or a mixture of several of different species of polyol poly(hydroxy fatty acid) esters. The latter is typically the case when the pphe dispersing agent is prepared from sources such as polyglycerol polyricinoleate, which is prepared from glycerol and ricinoleic acid.

The source(s) of pphe dispersing agent may additionally contain impurities, such as by-products from the synthesis of the pphe or impurities present in starting materials of the synthesis. The composition of the invention will therefore typically contain minor amounts of impurities, such as e.g. free or esterified fatty acids.

The pphe source preferably contains at most 50% (w/w) impurities, i.e. non-pphe molecules. For example, the pphe source may contain at most 30% (w/w) impurities. The pphe source may e.g. contain at most 20% (w/w) impurities. Alternatively, pphe source may contain at most 10% (w/w) impurities. For example, the pphe source preferably contains at most 5% (w/w) impurities.

In the context of the present invention, the term "polyol" relates to an organic molecule containing at least three hydroxyl groups. Preferably, the polyol has a carbon-backbone or linked sections of carbon-backbone to which the hydroxyl groups are bound.

The polyol may e.g. be a monomeric polyol. Examples of useful monomeric polyols are e.g. glycerol, sugar alcohols and/or sugars.

Examples of useful sugar alcohols are arabitol, erythritol, isomalt, lactitol, maltitol, mannitol, sorbitol and/or xylitol.

Examples of useful sugars are e.g. monosaccharides, such as glucose, galactose, fructose or disaccharides, such as sucrose and/or lactose.

In some preferred embodiments of the invention the polyol is sucrose and the pphe dispersing agent is a sucrose poly(hydroxy fatty acid) ester.

In other preferred embodiments of the invention the polyol is a polymeric polyol, i.e. the product of di-, tri- or polymerisation of one or more types of hydroxyl-containing monomers (e.g. small polyols). The polymeric polyol may e.g. contain, or even consist of, discrete polyols linked by ether linkages, glycosidic linkages and/or acetalic linkages.

In some preferred embodiments of the invention, the polyol is poly(glycerol).

In some embodiments of the invention the polyol has an average degree of polymerisation (DP) of at least 1.5. The polyol may for example have a degree of polymerisation of at least 2. Preferably, the polyol has a degree of polymerisation of at least 3. Alternatively the polyol may have a degree of polymerisation of at least 4. In other embodiments the polyol may have a degree of polymerisation of at least 5. Alternatively the polyol may have a degree of polymerisation of at least 6.

In the context of the present invention the term "average degree of polymerisation" or "degree of polymerisation" relates to number-average degree of polymerisation of the polymer or oligomer in question.

In some preferred embodiments of the invention the polyol has an average degree of polymerisation in the range of 1.5-10. The polyol may for example have an average degree of polymerisation in the range of 2-8. Preferably, the polyol has a degree of polymerisation in the range of 2-6.

In some embodiments the polyol mainly comprises di-, tri- and tetra-polyol. Hence, in some embodiments at least 70% of the polyol is di-, tri- and tetrapolyol and in more preferred embodiments at least 75% of the polyol is di-, tri- and tetrapolyol.

The poly(hydroxy fatty acid)s are e.g. obtainable by poly-condensation of the hydroxy fatty acids. Hydroxy fatty acids are fatty acids having one or more hydroxyl groups in the hydrocarbon tail.

Each poly(hydroxy fatty acid) contains at least two linked hydroxy fatty acids. In some embodiments of the invention the poly(hydroxy fatty acid) has an average degree of polymerisation of at least 2. The poly(hydroxy fatty acid) may for example have a degree of polymerisation of at least 3. Preferably, the poly(hydroxy fatty acid) has a degree of polymerisation of at least 4. Alternatively, the poly(hydroxy fatty acid) may have a degree of polymerisation of at least 5.

In some preferred embodiments of the invention the poly(hydroxy fatty acid) has an average degree of polymerisation in the range of 2-10. The poly(hydroxy fatty acid) may for example have a degree of polymerisation in the range of 3-8. Preferably, the poly(hydroxy fatty acid) has a degree of polymerisation of at least 4-7. In yet other preferred embodiments the poly(hydroxy fatty acid) has a degree of polymerisation of at least 5-7.

In some preferred embodiments of the invention at least 80% (w/w) of the poly(hydroxy fatty acid)s of the polyol poly(hydroxy fatty acid) ester contains at least 5 linked hydroxy fatty acids. For example, at least 90% (w/w) of the poly(hydroxy fatty acid) of the polyol poly(hydroxy fatty acid) ester may contain at least 5 linked hydroxy fatty acids.

In some preferred embodiments of the invention, the esterified poly(hydroxy fatty acid) is poly(ricinoleate), i.e. the product of inter-esterification of ricinoleic acid.

Ricinoleic acid can be derived from the castor oil of castor beans and therefore has a vegetable origin and is a renewable resource. In a preferred embodiment of the invention, the ricinoleic acid and the resulting pphe dispersing agent (e.g. PGPR) is an environment-friendly organic dispersing agent.

While the weight ratio between the polyol and the poly(hydroxy fatty acid) of the pphe dispersing agent may vary to a certain extent, it is, however, preferred that the poly(hydroxy fatty acid) contributes with at least as much weight to the pphe dispersing agent as the polyol.

In some embodiments of the invention, the weight ratio between the polyol and the poly(hydroxy fatty acid) of the pphe is at most 1:1. For example, the weight ratio between the polyol and the poly(hydroxy fatty acid) of the pphe may be at most 1:2. The weight ratio between the polyol and the poly(hydroxy fatty acid) of the pphe may e.g. be at most 1:5, such as approx. 1:10.

The pphe is preferably formed by esterifying poly(hydroxy fatty acid)s with the polyol, whereby ester-linkages are formed between hydroxyl groups of the polyol and carboxylic acid groups of the poly(hydroxy fatty acid)s. The pphe may be produced according to e.g. G. Schuster, "Emulgatoren für Lebensmittel", Springer Verlag 1985. The production may be performed in 3 steps:

1) polyglycerol formation by polymerization of glycerol,
2) polyester formation by self-condensation of the hydroxyl fatty acids, and
3) esterification of the polyglycerol with the polyester of hydroxyl fatty acids.

In some preferred embodiments of the invention, the pphe dispersing agent is poly(glycerol) poly(ricinoleate) ester (also referred to as PGPR).

PGPR has GRAS-status (Generally Regarded As Safe for food production) or is recognised as a safe food additive in a number of countries and is therefore used in a number of different food applications, such as in the production of low fat spreads. PGPR is commercially available—e.g. via the products Palsgaard 4110, Palsgaard 4125, Palsgaard 4150 and Palsgaard 4175 (Palsgaard A/S, Denmark).

In some embodiments of the invention the poly(glycerol) of the pphe dispersing agent, e.g. PGPR, has an average degree of polymerisation at least 1.5. The poly(glycerol) may for example have a degree of polymerisation of at least 2. Preferably, the poly(glycerol) has a degree of polymerisation of at least 3. Alternatively, the poly(glycerol) may have a degree of polymerisation of at least 4.

In some preferred embodiments of the invention the poly(glycerol) has an average degree of polymerisation in the range of 1.5-10. The poly(glycerol) may for example have an average degree of polymerisation in the range of 2-8. Preferably, the poly(glycerol) has a degree of polymerisation in the range of 2-5.

In some embodiments the poly(glycerol) mainly comprises di-, tri- and tetra-polyol. Hence, in some embodiments at least 70% of the poly(glycerol) is di-glycerol, tri-glycerol and tetra-glycerol and in more preferred embodiment at least 75% of the poly(glycerol) is di-glycerol, tri-glycerol and tetra-glycerol.

In some embodiments of the invention the poly(ricinoleate) of the pphe dispersing agent, e.g. PGPR, has an average degree of polymerisation of at least 2. The poly(ricinoleate) may for example have a degree of polymerisation of at least 3. Preferably, the poly(ricinoleate) has a degree of polymerisation of at least 4. Alternatively, the poly(ricinoleate) may have a degree of polymerisation of at least 5.

In some preferred embodiments of the invention the poly(ricinoleate) has an average degree of polymerisation in the range of 2-10. The poly(ricinoleate) may for example have a degree of polymerisation in the range of 3-8. Preferably, the poly(ricinoleate) has a degree of polymerisation of at least 4-7. In yet other preferred embodiments the poly(ricinoleate) has a degree of polymerisation of at least 5-7.

In some embodiments of the invention the esterified polyol, e.g. poly(glycerol) has an average degree of substitution of at least 10%. Preferably, the average degree of substitution of the esterified polyol is at least 20%. For example, the average degree of substitution of the esterified polyol may e.g. be at least 30%. The average degree of substitution of the esterified polyol may e.g. be at least 40%.

In context of the present invention the term "average degree of substitution" is determined as $$\frac{N_0 - N_1}{N_0} * 100\%$$

where $N_0$ is the total number of available hydroxyl groups in the polyol before esterification and $N_1$ is the total number of available hydroxyl groups in the esterified polyol which forms part of the pphe dispersing agent.

In some embodiments of the invention, the weight ratio between the poly(glycerol) and the poly(ricinoleate) of the PGPR dispersing agent is at most 1:1. For example, the weight ratio between the poly(glycerol) and the poly(ricinoleate) of the PGPR dispersing agent may be at most 1:2. The weight ratio between the poly(glycerol) and the poly(ricinoleate) of the PGPR dispersing agent may e.g. be at most 1:5, such as approx. 1:10.

In some preferred embodiments of the invention, the pphe dispersing agent is the polyol poly(hydroxy fatty acid) ester sucrose poly(ricinoleate) (also referred to as SPR).

The pphe dispersing agent may be characterised by one or more parameters, such as its hydroxy value, its saponification value, its acid value and/or its iodine value.

The hydroxy value of a pphe dispersing agent may e.g. be 60-120, and preferably 80-100.

The saponification value of a pphe dispersing agent may e.g. be 100-300, and preferably 150-250 or 150-180.

The acid value of a pphe dispersing agent may e.g. be 0-10, and preferably 0-6, or 0-2 or 0-1.

The iodine value of a pphe dispersing agent may e.g. be 10-140, such as e.g. 50-110 or 70-90.

The masterbatch of the invention may, in addition to the pphe dispersing agent, comprise a second dispersing agent. Examples of useful second dispersing agents are phospholipids like lecithin, ammoniumphosphatide, amide wax, such as for example ethylene bisstearamide (EBS) wax, and similar dispersing agent.

In some embodiments of the invention, the total amount of pphe dispersing agent in the masterbatch is at least 0.5% (w/w) relative to the total weight of the masterbatch. The total amount of the pphe dispersing agent may e.g. be at least 2.5% (w/w) relative to the total weight of the masterbatch. Alternatively, the total amount of the pphe dispersing agent may be at least 5% (w/w) relative to the total weight of the masterbatch. For example, the total amount of the pphe dispersing agent in the masterbatch may be at least 10% (w/w) relative to the total weight of the masterbatch.

In some preferred embodiments of the invention, the total amount of pphe dispersing agent in the masterbatch is in the range of 0.5-20% (w/w) relative to the total weight of the masterbatch. The total amount of pphe dispersing agent may e.g. be in the range of 1-15% (w/w) relative to the total weight of the masterbatch. Alternatively, the total amount of pphe dispersing agent may be in the range of 2-12.5% (w/w) relative to the total weight of the masterbatch. For example, the total amount of pphe dispersing agent in the composition may be in the range of 3-10% (w/w) relative to the total weight of the masterbatch.

In other preferred embodiments of the invention, the total amount of pphe dispersing agent in the masterbatch is in the range of 0.5-10% (w/w) relative to the total weight of the masterbatch. The total amount of pphe dispersing agent may e.g. be in the range of 0.5-5% (w/w) relative to the total weight of the masterbatch. Alternatively, the total amount of pphe dispersing agent may be in the range of 0.5-2.5% (w/w) relative to the total weight of the masterbatch. For example, the total amount of pphe dispersing agent in the masterbatch may be in the range of 0.5-1% (w/w) relative to the total weight of the masterbatch.

In other preferred embodiments of the invention, the total amount of pphe dispersing agent in the masterbatch is in the range of 1-10% (w/w) relative to the total weight of the masterbatch. The total amount of pphe dispersing agent may e.g. be in the range of 2.5-10% (w/w) relative to the total weight of the masterbatch. Alternatively, the total amount of pphe dispersing agent may be in the range of 5-10% (w/w) relative to the total weight of the masterbatch. For example, the total amount of pphe dispersing agent in the masterbatch may be in the range of 7.5-10% (w/w) relative to the total weight of the masterbatch.

In the context of the present invention the term "colorant" relates to pigments for coloring thermoplastic polymers and thermoplastic products. Pigments are organic, metalorganic or inorganic particles that are insoluble in polymers.

In the context of the present invention, the term "particles insoluble in polymers" relates to particles that have a solubility in a given polymer of at most 0.5% (w/w) at 25 degrees C. For example, the insoluble particles may have a solubility in a given polymer of at most 0.1% (w/w) at 25 degrees C., or even lower.

The organic, metalorganic and inorganic pigment particles can be used separately or in combination. The pigments may be in any form of a dry powder or pigment dispersion. In mixtures the pigments may for example contain a core of inorganic material coated with organic material or a core of organic material coated with inorganic material.

Illustrative examples of the organic pigments include azo pigments and polycyclic pigments and mixtures thereof.

Examples of azo pigments include, but are not limited to, monoazo and disazo pigments, benzimidazolones, diarylides, pyrazolones, yellows and reds and mixtures thereof.

Examples of polycyclic pigments include, but are not limited to, phthalocyanines, quinacridones, perylenes, perinones, dioxazines, anthraquinones, isoindolins, thioindigo, diaryl or quinophthalone pigment, Aniline Black and mixtures thereof.

Illustrative examples of the inorganic pigments include white pigments, black pigments, red pigments, blue pigments, green pigments and yellow pigments and mixtures thereof.

Examples of white pigments include, but are not limited to, $TiO_2$, $CaCO_3$, ZnO, $ZnSO_4$, ZnS, litophones and mixtures of these.

Examples of black pigments include, but are not limited to, Carbon black, graphite, black iron oxide, iron manganese black, Copper black, Chrome black and mixtures of these.

Examples of red pigments include, but are not limited to, $Fe_2O_3$, molybdate red, ultramarine red, Cadmium Red and mixtures of these.

Examples of blue pigments include, but are not limited to, ultramarine blue, manganese blue, Prussian blue, Cerulean Blue, Cobalt Blue and mixtures of these.

Examples of green pigments include, but are not limited to, $Cr_2O_3$ (Chromium Green Oxide), Viridian, Cobalt Green and mixtures of these.

Examples of yellow pigments include, but are not limited to, titanium yellow, Lead Yellow, cadmium sulphide, cadmium zinc sulphide, iron oxide yellow, nickel titanium yellow, chrome yellow, chromium titanium yellow, bismuth vanadate and mixtures of these.

It is to be noted that according to Encyclopedic Dictionary of Polymers, page 109, the term "$CaCO_3$" takes three different meanings:
"Calcium Carbonate Fillers" is a fine powder of calcium carbonate (white) to fill spaces in a polymer or coating.
"Calcium Carbonate, Natural", $CaCO_3CaMg(CO_3)_2$, Pigment White 18, is a white extender pigment derived from natural chalk, limestone or dolomite. It consists of calcium carbonate with up to about 44% magnesium carbonate.

"Calcium Carbonate, Synthetic", $CaCO_3$, Pigment white 18, is manufactured by a precipitation process in order to obtain a finer or more uniform particle size range.

When $CaCO_3$ is mentioned herein as a white colorant pigment it is meant to cover the pigments "Calcium Carbonate, Natural" or "Calcium Carbonate, Synthetic. It is not meant to cover the filler "Calcium Carbonate Fillers".

The particle size of the colorant particles may vary according to the specific application. In some embodiments of the invention the colorant particles have an average particle size of at most 50 micrometer. For example, the colorant particles may have an average particle size of at most 30 micrometer. Preferably, the colorant particles have an average particle size of at most 20 micrometer.

Even smaller particle sizes may be used. Thus, in some embodiments of the invention the colorant particles have an average particle size of at most 10 micrometer. For example, the colorant particles may have an average particle size of at most 5 micrometer. Preferably, the colorant particles have an average particle size of at most 1 micrometer.

In the context of the present invention, the term "particle size" relates to the hydrodynamic diameter of the water-insoluble particles and is preferably measured using laser diffraction analysis.

The inventors have also found that the pphe dispersing agent is effective in masterbatches having a relatively high concentration of colorant particles. This discovery allows for highly concentrated masterbatches having much lower yield values than one previously would have expected. This opens up for producing highly concentrated pigment masterbatches.

In some preferred embodiments of the invention, the total amount of colorant particles in the masterbatch is at least 10% (w/w) relative to the total weight of the masterbatch. The total amount of the colorant particles may e.g. be at least 20% (w/w) relative to the total weight of the masterbatch. Alternatively, the total amount of the colorant particles may be at least 25% (w/w) relative to the total weight of the masterbatch. For example, the total amount of the colorant particles in the masterbatch may be at least 30% (w/w) relative to the total weight of the masterbatch.

In other preferred embodiments of the invention, the total amount of the colorant particles in the masterbatch is in the range of 10-50% (w/w) relative to the total weight of the masterbatch. The total amount of the colorant particles may e.g. be in the range of 20-50% (w/w) relative to the total weight of the masterbatch. Alternatively, the total amount of the colorant particles may be in the range of 25-50% (w/w) relative to the total weight of the masterbatch. For example, the total amount of the colorant particles in the masterbatch may be in the range of 30-50% (w/w) relative to the total weight of the masterbatch.

In other preferred embodiments of the invention, the total amount of the colorant particles in the masterbatch is in the range of 30-70% (w/w) relative to the total weight of the masterbatch. The total amount of the colorant particles may e.g. be in the range of 30-60% (w/w) relative to the total weight of the masterbatch. Alternatively, the total amount of the colorant particles may be in the range of 30-40% (w/w) relative to the total weight of the masterbatch. For example, the total amount of the colorant particles in the masterbatch may be in the range of 40-50% (w/w) relative to the total weight of the masterbatch.

All masterbatches are produced with a carrier resin. The carrier resin encapsulates the colorant particles and the pphe dispersing agent and causes the masterbatch to be of granular shape, which is easy to handle during the subsequent coloring process. Commercial available carrier resins include polyethylene resins, polypropylene resins, polystyrene resins, ethylene methacrylate resins, polyethylene terephthalate resins, polylactic acid resins and polyamide resins.

During the preparation of the masterbatch, pigments, dispersing agents and optionally one or more additive(s) are dispersed into the carrier system which is formulated to effectively disperse the colorants and optionally other additives and provide full compatibility with the final manufacturing process where the colored product is produced.

The masterbatch carrier system may either be a polymer specific system or a universal carrier system.

Polymer specific carrier systems are made up using the same polymer as used in the final manufacturing process. This system ensures compatibility with minimal effect on the physical properties of the final product. In some polymer specific carrier systems LDPE resin (low density polyethylene) is used as carrier resin for coloring polyethylene and polypropylene thermoplastics, whereas polystyrene may be used as carrier resin for coloring polystyrene or ABS thermoplastics.

Universal carrier systems are formulated to be compatible with as many resins as possible, thereby providing one masterbatch which is able to color several different polymer types.

The masterbatches of the present invention comprises carrier resins which preferably are thermoplastic polymers. The thermoplastic polymers are preferably selected from the group consisting of polyolefins, acrylic resins, styrene polymers, polycarbonates, polyamides, polyesters, thermoplastic polyurethanes, polyether sulphones, polysulphones, vinyl polymers and mixtures of these.

Polyolefins may be selected from those prepared by polymerisation or copolymerisation of monomers such as ethylenically and/or acetylenically unsaturated monomers having from 2 to 20 carbon atoms. Examples include, but are not limited to, C2-10 alpha-olefins including ethylene, propylene, isobutylene, 1-butene, 1-hexene, 4-methyl-1-pentene, and 1-octene. Preferred examples of polyolefins include, but are not limited to, polyethylene and polypropylene, such as for example high density polyethylene (HDPE), low density polyethylene (LDPE), linear low density polyethylene (LLDPE) and very low density polyethylene (VLDPE).

Acrylic resins which may be used are the polyalkyl and/or polyaryl esters of (meth)acrylic acid, poly(meth)acrylamides and poly(meth)acrylonitrile. A preferred example of acrylic resins includes ethylene methacrylate (EMA).

Styrene polymers which may be used are any of the (co)polymers which are composed entirely or in part of vinylaromatic compounds. Examples of suitable vinylaromatic compounds are styrene and styrene derivatives, such as mono- or polyalkyl-substituted and/or halogen-substituted styrene, and also corresponding naphthyl compounds. Preferred examples of styrene polymers include styrene copolymers. Among these are graft copolymers of acrylonitrile and styrene on butadiene rubbers, also known as ABS polymers, graft copolymers of styrene and acrylonitrile on polyalkyl acrylate rubbers, also known as ASA polymers, and styrene-acrylonitrile copolymers, also known as SAN copolymers. Preferred styrene polymers include, but are not limited to, ASA polymers.

Polycarbonates which may be used are polycarbonates and (co)polycarbonates. The (co)polycarbonates typically have a molar mass in the range from 10000 to 200000 g/mol. Examples of (co)polycarbonates are those that are obtainable via reaction of diphenyl carbonate with bisphenols. Preferred bisphenol is 2,2-di(4-hydroxyphenyl)propane, usually termed bisphenol A. Use may also be made of other aromatic dihydroxy compounds other than bisphenol A, in particular 2,2-di(4-hydroxyphenyl)pentane, 2,6-dihydroxynaphthaline, 4,4'-dihydroxydiphenyl sulphane, 4,4'-dihydroxydiphenyl ether, 4,4'-dihydroxydiphenyl sulphite, 4,4'-dihydroxydiphenylmethane, 1,1-di(4-hydroxyphenyl)ethane, 4,4-dihydroxybiphenyl, or dihydroxydiphenylcycloalkanes, preferably dihydroxy-phenylcyclohexanes or dihydroxyphenylcyclopentanes, in particular 1,1-bis(4-hydroxyphenyl)-3,3,5-trimethylcyclohexane, or else a mixture of the above-mentioned dihydroxy compounds. Particularly preferred polycarbonates are those based on bisphenol A or bisphenol A together with up to 80 mol % of the above-mentioned aromatic dihydroxy compounds.

Polyamides may be selected from those prepared by polycondensation products of diamines and dicarboxylic acid, e. g. adipic acid and hexamethylenediamine, or of amino acids, e. g. aminoundecanoic acid, or can be prepared via ring-opening polymerization of lactams, e g. caprolactam or laurolactam. Other polyamides which may be used are mixtures composed of polyamides and of polyethylene ionomers, e.g. ethene-methacrylic acid copolymers, containing for example sodium counterions, zinc counterions and/or lithium counterions.

Polyesters which may be used include the relatively high or high molecular weight esterification products of dibasic acids, in particular terephthalic acid, with dihydric alcohols, especially ethylene glycol. Suitable examples of polyalkylene terephthalates include polyethylene terephthalate (PET); polybutylene terephthalate (PBT) and polyethylene terephthalate polyester (PETB).

Thermoplastic polyurethanes are fundamentally the reaction products of diisocyanates and of long-chain diols. Thermoplastic polyurethanes have no, or only very slight, crosslinking and accordingly a linear structure. Thermoplastic polyurethanes are well known to the person skilled in the art.

The polymer classes of the polyether sulphones and polysulphones are likewise known to the person skilled in the art.

Vinyl polymers which can be used include polyvinyl chloride (PVC) and copolymers thereof. Copolymers of vinyl chloride can be prepared by the known processes such as for example suspension, bulk or emulsion polymerization. Copolymers of vinyl chloride include those having up to 30% by weight of comonomers, such as vinyl acetate, vinylidene chloride, vinyl ether, acrylonitrile, acrylate, maleic mono- or diesters or olefins. Graft polymers of polyvinyl chloride and polyacrylonitrile, are also included as suitable vinyl polymers.

The total amount of carrier resin in the masterbatch may be at least 30% (w/w) relative to the total weight of the masterbatch. The total amount of carrier resin may e.g. be at least 40% (w/w) relative to the total weight of the masterbatch. Alternatively, the total amount of carrier resin may be at least 50% (w/w) relative to the total weight of the masterbatch. For example, the total amount of carrier resin in the masterbatch may be at least 60% (w/w) relative to the total weight of the masterbatch.

In some preferred embodiments of the invention, the total amount of carrier resin in the masterbatch is in the range of 30-80% (w/w) relative to the total weight of the masterbatch. The total amount of carrier resin may e.g. be in the range of 30-70% (w/w) relative to the total weight of the masterbatch. Alternatively, the total amount of carrier resin may be in the range of 40-70% (w/w) relative to the total weight of the masterbatch. For example, the total amount of carrier resin in the masterbatch may be in the range of 40-60% (w/w) relative to the total weight of masterbatch.

In other preferred embodiments of the invention, the total amount of carrier resin in the masterbatch is in the range of 40-80% (w/w) relative to the total weight of the masterbatch. The total amount of carrier resin may e.g. be in the range of 45-70% (w/w) relative to the total weight of the masterbatch. Alternatively, the total amount of carrier resin may be in the range of 50-70% (w/w) relative to the total weight of the masterbatch. For example, the total amount of carrier resin in the masterbatch may be in the range of 50-60% (w/w) relative to the total weight of the masterbatch.

The masterbatches of the present invention may also comprise one or more additive(s).

Illustrative examples are ultraviolet light absorbers, heat stabilizers, light stabilizers, antioxidants, flame-retardants, antibacterial agents, surface tension reducers, deodorizing agents, anti-static agents, anti-blocking agents, plasticizer agents, conductive agents, blowing agents, fillers, internal mold release agents and slip agents.

These additives may be in the form of solid compounds, such as particles or powders, viscous substances and/or liquids.

In some preferred embodiments of the invention, the total amount of additive in the masterbatch is in the range of 0-30% (w/w) relative to the total weight of the masterbatch. The total amount of additive may e.g. be in the range of 5-25% (w/w) relative to the total weight of the masterbatch. Alternatively, the total amount of additive may be in the range of 5-20% (w/w) relative to the total weight of the masterbatch. For example, the total amount of additive in the masterbatch may be in the range of 10-15% (w/w) relative to the total weight of masterbatch.

In other preferred embodiments of the invention, the total amount of additive in the masterbatch is in the range of 5-30% (w/w) relative to the total weight of the masterbatch. The total amount of additive may e.g. be in the range of 10-30% (w/w) relative to the total weight of the masterbatch. Alternatively, the total amount of additive may be in the range of 15-30% (w/w) relative to the total weight of the masterbatch. For example, the total amount of additive in the masterbatch may be in the range of 20-30% (w/w) relative to the total weight of the masterbatch.

In other preferred embodiments of the invention, the total amount of additive in the masterbatch is in the range of 0.5-10% (w/w) relative to the total weight of the masterbatch. The total amount of additive may e.g. be in the range of 0.5-7.5% (w/w) relative to the total weight of the masterbatch. Alternatively, the total amount of additive may be in the range of 0.5-5% (w/w) relative to the total weight of the masterbatch. For example, the total amount of additive in the masterbatch may be in the range of 0.5-2.5% (w/w) relative to the total weight of the masterbatch.

In alternative embodiments the masterbatch comprises one or more additive(s), which are present in the masterbatch as particle(s), a pphe dispersing agent and carrier resin. In special embodiments these masterbatches does not comprise colorant particles. Such masterbatches may be used to produce non-colored thermoplastic products. In these non-colored thermoplastic products the additive particles are more uniformly dispersed because of the presence of the pphe dispersing agent as compared with products produced by using masterbatches comprising commercial available dispersing agents, such as for example metal soaps or waxes, such as for example ethylene bisstearamide (EBS) wax.

A non-colored thermoplastic product may be produced in the same manner as the colored thermoplastic products as described below but without including a colorant in the mixture.

In preferred embodiments of the invention the masterbatch composition comprises 0.5-20% (w/w) pphe dispersing agent, 10-50% (w/w) colorant and 30-80% (w/w) carrier resins relative to the total weight of the masterbatch.

In more preferred embodiments of the invention the masterbatch composition comprises 3-10% (w/w) pphe dispersing agent, 30-50% (w/w) colorant and 40-60% (w/w) carrier resins relative to the total weight of the masterbatch.

In other embodiments of the invention the masterbatch composition comprises 0.5-20% (w/w) pphe dispersing agent, 10-40% (w/w) colorant, 1-10% (w/w) additive and 30-80% (w/w) carrier resins relative to the total weight of the masterbatch.

In yet other embodiments of the invention the masterbatch composition comprises 3-10% (w/w) pphe dispersing agent, 30-50% (w/w) colorant, 1-10% (w/w) additive and 40-60% (w/w) carrier resins relative to the total weight of the masterbatch.

The masterbatch of the present invention may be produced by a method comprising the steps of:
  a) providing a pphe dispersing agent, a colorant, a carrier resin and optionally one or more additive(s),
  b) mixing the pphe dispersing agent, the colorant, the carrier resin and additives, if any, so as to form the masterbatch, and
  c) optionally forming the masterbatch of step b into granulates or pellets.

In the first step, step a, the components to form part of the masterbatch are provided and in the second step the masterbatch components are mixed together.

Before actual mixing of the masterbatch, some or all of the components can be premixed if desired, for which a drum or a tumbler mixer may be used, such as for example a high intensity mixer, or the pre-mixing may be performed in an extruder.

In some embodiments the pphe dispersing agent and the colorant is pre-mixed and then this pre-mixture is mixed with the carrier resin. In other embodiments the pphe dispersing agent and the carrier resin is pre-mixed and this pre-mixture is then mixed with the colorant. In yet other embodiments the colorant and the carrier resins is pre-mixed and then this pre-mixture is mixed with pphe dispersing agent.

In some embodiments all of the components are present in the form of dry particles or powders, and then a dry pre-mixture will be obtained. In other embodiments some of the components may be present as a liquid or viscous substance and then a paste or paste-like mixture will be formed.

In other embodiments all of the masterbatch components may be added to the mixer and then mixed, and in other embodiments the components are added to the mixer individually at any point during the mixing process.

The mixing step, step b, is typically performed by extrusion, but in some cases the mixing is performed by kneading and extrusion.

The actual dispersion generally takes place on roller mills or in a kneader or an extruder, such as a single-screw or preferably a twin-screw extruder. However, any equipment known in the art may be used. Illustrative examples include Buss kneaders, planetary roll extruders, open double-trough kneaders, rapid stirrers, internal fluxing mixers such as Banbury mixers and Farrel continuous mixers, or the like.

Most often the masterbatch obtained in step b is subsequently formed into granulate of pellets or the like, which makes the subsequent handling of the masterbatch more convenient. This procedure may be performed by grinding, fine spraying, hot chopping or strand pelletizing.

In some embodiments the pphe dispersing agent and the carrier resin is pre-mixed and processed into pellets, before said pellets are used in the preparation of the masterbatch by mixing of said pellets with colorant pigment particles.

The pellets comprising pphe dispersing agent and carrier resin may be produced as a novel product, which may be sold to masterbatch manufacturers. The masterbatch may subsequently be produced by mixing the pellets with colorant pigment particles.

The pellets comprising pphe dispersing agent and carrier resin may be produced by thoroughly mixing the pphe dispersing agent and the carrier resin on roller mills or in a kneader or an extruder, such as a single-screw or twin-screw extruder in a similar way as the mixing of the masterbatch as described above. After mixing, the mixture of pphe dispersing agent and carrier resin is processed into pellets by any known method, such as for example pressing the mixture through holes of a die, cutting it into appropriate pellet shapes and cooling the pellets for example by use of a water bath.

In particular embodiments the pphe dispersing agent and colorant particles are premixed so that colorant particles coated with pphe dispersing agent are prepared. These coated particles are subsequently used in the preparation of the masterbatch by mixing with carrier resins. The coated particles can be prepared and stored for months before the masterbatch is prepared or they may be produced as part of a continuous process in the production process.

In some embodiments the coated colorant particles are made of 1-40% pphe dispersing agent and 60-99% colorant particles and in preferred embodiments the coated particles are made of 10-30% pphe dispersing agent and 70-90% colorant particles. In some embodiments the coating of the coated colorant particles can be a combined coating consisting of pphe dispersing agent together with other dispersing agents or additives for use in the colored thermoplastic compositions and products.

The masterbatch may be used in the process of coloring thermoplastic polymers so that colored thermoplastic products are obtained.

Illustrative examples of thermoplastic polymers which may be colored by use of the masterbatch of the present invention include, but are not limited to, polyolefins, acrylic resins, styrene polymers, polycarbonates, polyamides, polyesters, thermoplastic polyurethanes, polyether sulphones, polysulphones, vinyl polymers and mixtures of these, particularly suitable materials being the acrylic resins, the styrene polymers and the thermoplastic polyurethanes.

These thermoplastic polymers include all thermoplastic polymers which may also be used as carrier resins and have been discussed above in more detail.

In preferred embodiments the thermoplastic polymer to be colored is the same thermoplastic polymer as the one which is present in the masterbatch as carrier resin.

In some embodiments the thermoplastic polymers to be colored are polyethylene or polypropylene and the carrier resin is linear low density polyethylene (LLDPE).

The total amount of masterbatch in the colored thermoplastic polymer product may vary in type of dispersing agent, type of colorant particles and type(s) of thermoplastic polymer(s). In some embodiments the total amount of masterbatch lies in the range of 0.05-5% (w/w) relative to the total weight of colored thermoplastic polymer product. The total amount of masterbatch in the colored thermoplastic polymer product may e.g. be in the range of 0.1-2.5% (w/w) relative to the total weight of colored thermoplastic polymer product. For example the total amount of masterbatch in the colored thermoplastic polymer product may e.g. be in the range of 0.25-2% (w/w) relative to the total weight of colored thermoplastic polymer product. In preferred embodiments the total amount of masterbatch in the colored thermoplastic polymer product may e.g. be in the range of 0.5-1% (w/w) relative to the total weight of colored thermoplastic polymer product.

Another aspect of the present invention relates to a method for producing a colored thermoplastic composition, which subsequently may be formed into a desired shape so that a colored thermoplastic product is obtained. Such method typically comprises the steps of:
i) providing a masterbatch and one or more thermoplastic polymer(s),
ii) mixing the masterbatch and said one or more thermoplastic polymer(s), so as to form the colored thermoplastic polymer composition, and
iii) processing the colored thermoplastic polymer composition obtained in step b into the desired shape of the colored thermoplastic product.

Hence, the colored thermoplastic polymer product may be produced by mixing a masterbatch with a compatible thermoplastic polymer and processing said mixture. The mixing (i.e. step ii) and the processing (i.e. step iii) may be performed as a one step process or the mixing and the processing may be performed in two separate steps, where the first step (step ii) is a pre-mixing step, in which a colored composition is obtained, and where the colored composition is subsequently processed in a second step (step iii) by shaping the colored composition into the desired shape.

Preferably the compatible thermoplastic polymer is in its melted state when mixed with the masterbatch.

In step iii the colored thermoplastic polymer composition may be formed into various shapes, such as sheet, film, tube, bottles, containers, molded products and other molded articles.

In the context of the present invention the term "processing" relates to the conversion of polymers into articles of a desired shape. Illustrative examples of processing are extrusion, molding, extrusion molding, injection molding, blow molding, compression molding, film extrusion, blown film extrusion, sheet extrusion, fiber extrusion, fiber spinning, profile extrusion, pipe extrusion, rotational molding and calendering.

The mixing of the masterbatch with the compatible thermoplastic polymer can be accomplished by any means known in the art. The methods for producing the masterbatch itself (as disclosed above) may also be used for producing the colored thermoplastic polymer compositions. Preferably the mixing of step ii is performed by feeding the masterbatch and the compatible thermoplastic polymer to a kneader or an extruder.

The masterbatch may be mixed with the thermoplastic polymer and processed via either a batch or continuous process. In one embodiment, the masterbatch may be added to the compatible thermoplastic polymer and processed on a compounding mill, simple kneader, or other internal mixer or in a mixing extruder.

Alternatively, the masterbatch can be metered to the feed section of an extruder by appropriate devices. Continuous processes can be carried out, for example, in rapid mixers, single-screw extruders, twin-screw extruders, Buss kneaders, planetary roll extruders, open double-trough kneaders or rapid stirrers. The continuous processes are preferred.

One major advantage of the present invention is the viscosity reducing effect which is obtained due to the presence of pphe dispersing agent. Using such less viscous compositions in the extrusion or molding process will provide a number of beneficial effects. First of all, the extrusion or molding process may proceed at a lower temperature and/or pressure, which results in lower energy consumption. Secondly, the option of performing the extrusion or molding process at a lower temperature makes it possible to incorporate heat sensitive compounds into the composition, because the lower temperature may reduce the degree of degradation and/or decomposition of such heat sensitive compounds. Thirdly, the use of a less viscous polymer composition may facilitate the mold filling during the mold injection process.

In alternative embodiments the colored thermoplastic compositions may be produced without specifically using a pre-produced masterbatch. In such cases steps i and ii will be performed as a one step procedure, where dispersing agent, colorant particles and thermoplastic polymers are mixed by use of very efficient mixing equipment.

Accordingly, the colored thermoplastic product may be produced in a two step process, where all ingredients are thoroughly mixed in a single first step where after the mixture is processed into the desired shape of the colored thermoplastic product in the second step.

In such embodiments the colored thermoplastic composition is produced by direct mixing of 0.01-0.1% pphe dispersing agent, 0.2-0.4% colorant particles and about 99.5% thermoplastic polymer. In a preferred embodiment the colored thermoplastic composition is produced by direct mixing of 0.05% pphe dispersing agent, 0.1-0.2% colorant particles and about 99.8% thermoplastic polymer.

The colored thermoplastic compositions may be formed into various shapes, such as sheet, film, tube, fibers, profiles, bottles, containers, molded products and other molded articles.

The products produced using the colored thermoplastic polymer compositions of the present invention is believed to be more friendly to the environment when the products are disposed of, because the pphe dispersing agent is biodegradable and will produce non-toxic compounds in the form of polyols and hydroxy fatty acids, such as for example glycerol and ricinoleic acid, when decomposed. Moreover, today PGPR is approved by national food and drug agencies and international bodies like FAO/WHO for use in food products.

The present invention also relates to the use of pphe as a dispersing agent for coloring of thermoplastic polymers.

EXAMPLES

Example 1. Coloring of Thermoplastic Polymers Using Heliogen Blue

Colored polymer samples containing PGPR together with a blue pigment were prepared in order to investigate the ability of pphe dispersing agents to disperse colorant particles in thermoplastic polymers. Comparative polymer samples were also prepared in which PGPR was replaced by a commercial dispersing agent.

The following compounds were used:
Dispersing agent: PGPR 4150, purchased from Palsgaard
Comparative dispersing agent: Abril 1041: an ethylene bis-stearamide (EBS) wax, purchased from Abril Industrial Waxes Limited
Colorant: Heliogen® Blue K 7090: blue pigment made of copper phthalocyanate, purchased from BASF.
Thermoplastic polymers: ExxonMobil® LLDPE LL 6101: a linear low density polyethylene resin, purchased from ExxonMobil; SABIC® PP 412MN40: a PP block copolymer, purchased from Sabic; and Elvaloy® AC 12024S: a copolymer of ethylene and methyl acrylate, purchased from DuPont.

The experiments were executed as follows:
1) The carrier resin polymer powder and the colorant pigment powder were fed to a high speed mixer, the mixing was started and then the dispersing agent was slowly added to the mixer. The mixing was continued until a homogeneous (visual) fluid powder was obtained. In cases where the powder was not fluid or appeared to be sticky, small amounts of anticaking agent in form of silicium dioxide (Sipernat, purchased from Evonik) was added. During mixing the temperature increased from approx. 30 degrees C. to 35-40 degrees C.
2) The pre-blend was then transferred to a twin screw extruder (Collin twin-screw compounder ZK 25) and extruded under high shear and mixing at 130-150 degrees C. The exact temperature for a specific mixture depended on carrier resin polymer type, pigment load and the like. The mixture left the extruder as a string which was passed into a water bath and then an air drying unit before it was chipped to approx. 2×3 mm round pellets. These pellets were the masterbatch.
3) The masterbatch was then blended with polymer pellets made of either polyethylene (PE), polypropylene (PP) or ethylene methacrylate (EMA) in a ratio of ½% or 1% masterbatch and the blend was fed to an extruder. In the extruder the polymer blend was extruded under thorough mixing and high shear at elevated temperature and shaped to form a film of 0.2-0.7 mm thickness.
4) A mix of 1% masterbatch was die casted to a wafer (ø 26 mM) with three sections of different thickness (1, 1.5 and 2.5 mm)

The colored polymer samples were analyzed by visual counting of pigment spots under microscope (10×), counting all visual particles within 5×7.5 mm field on random chosen areas. The counts were performed in duplicate and the mean value is used in the report. As the film thickness varied from recipe to recipe all counting was normalized to 0.1 mm film. Microscope pictures are made on Olympus BX 51 fitted with UC 30 camera.

The results are shown in the table below.

| Carrier resin | polymer | Heliogen Blue | Dispersing agent type | Dispersing agent | Counts |
|---|---|---|---|---|---|
| LLDPE | 50% | 40% | PGPR | 10% | 4 |
| LLDPE | 40% | 50% | PGPR | 10% | 45 |
| LLDPE | 55% | 40% | PGPR | 5% | 29 |
| LLDPE | 57% | 40% | PGPR | 3% | 80 |
| PP | 50% | 40% | PGPR | 10% | 29 |
| PP | 60% | 30% | PGPR | 10% | 6 |
| EMA | 50% | 40% | PGPR | 10% | 74 |
| EMA | 40% | 50% | PGPR | 10% | 79 |
| EMA | 55% | 40% | PGPR | 5% | 71 |
| EMA | 57% | 40% | PGPR | 3% | 52 |
| LLDPE | 55% | 40% | Abril 1041 wax | 5% | 115 |
| EMA | 50% | 40% | Abril 1041 wax | 10% | 132 |
| EMA | 55% | 40% | Abril 1041 wax | 5% | 112 |

From the results in the table it can be seen that there is an inverse relation between the concentration of the dispersing agent PGPR and the number of counts with a remarkable good performance for a 40% pigment load in presence of 10% PGPR load. Further it can be seen that the load of pigment under constant concentration of dispersing agent exhibits a positive relation to the particle counts.

Three different polymers were included in the test in order to investigate the influence from the polymer used as carrier resin in the master batch. LLD polyethylene and polypropylene both seem to respond to the addition of the PGPR dispersing agent in similar manners, while in case of the EMA higher counts and an inverse relationship between amount of dispersing agent and number of counts is observed. The inverse relationship (i.e. that the higher concentration of PGPR results in higher counts) is not obvious. But when the results of an EMA sample is compared with a similar sample containing the commercial dispersing agent (5% Abril 1041) the sample with 5% PGPR is found to have a significant lower count of 71 versus 112.

Figure 8A:
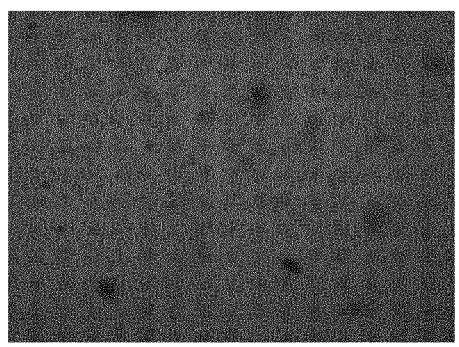
FIGS. 8a and 8b: EMA with 40% Heliogen Blue and 5% Abril 1041 wax added as 1% masterbatch to casted oblate and 0.5% masterbatch to film.
Figure 8B:
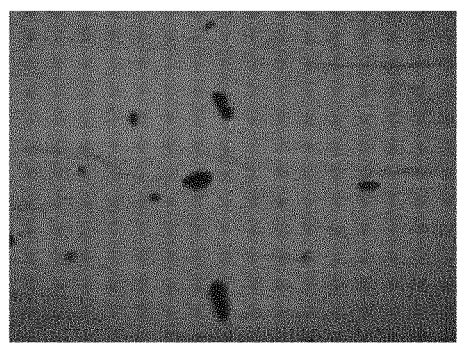
Figure 9A:
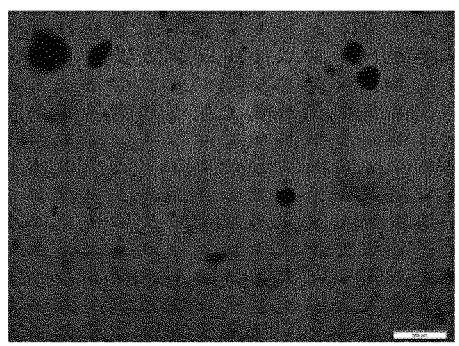
FIGS. 9a and 9b: EMA with 40% Heliogen Blue and 5% PGPR Palsgaard 4150 added as 1% to casted and 0.5% masterbatch to film.
Figure 9B:
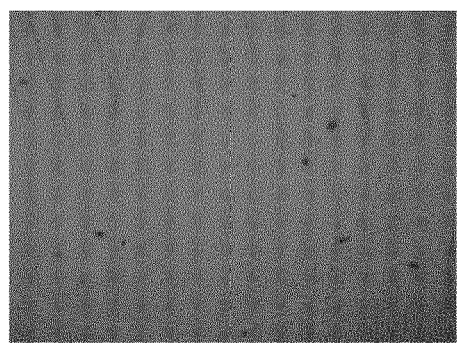

Microscope picture (40×) of the two samples is shown as FIGS. 8a and 8b versus FIGS. 9a and 9b and the difference is evident in the form of a lower number of spots in the PGPR based polymer. Moreover, the size of the spots or pigment particles in the PGPR sample is found to be of significant smaller size.

The same is the case when a comparison is made between LLD polyethylene samples containing 5% Abril 1041 or 5% PGPR, respectively, as the count number is 115 for the commercial product versus 29 for PGPR.

Example 2. Coloring of Thermoplastic Polymers Using Titanium Dioxide Pigment

Colored polymer samples were prepared as described in Example 1, except that titanium dioxide was used as colorant particles instead of Heliogen blue.

Two different titanium dioxide particles were investigated: Kronos 2220, purchased from Kronos International Inc., and Magnapearl® 2000, purchased from BASF.
Dispersing agent: PGPR Palsgaard 4150
Polymer: ExxonMobil™ LLDPE LL 6101: a linear low density polyethylene resin, purchased from ExxonMobil.

Figure 10:
FIG. 10: LLDPE with 30% Kronos 2220 and 10% Abril 1041 wax.
Figure 11:
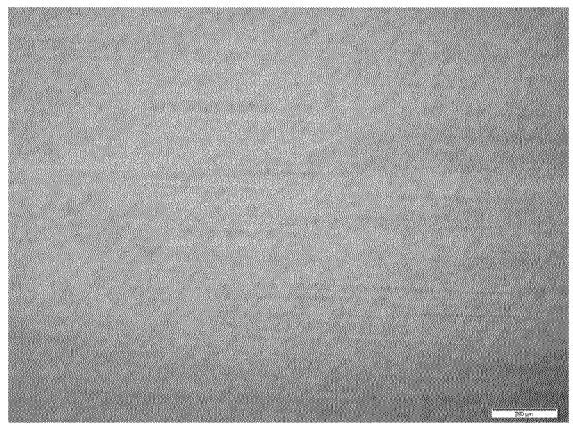
FIG. 11: LLDPE with 30% Kronos 2220 and 10% PGPR Palsgaard 4150.

A colored polymer sample comprising 30% Kronos 2220 and 10% PGPR was prepared. Particles or spots of colorant do not appear to be visible at a magnifier of 10×. A microscope picture of the polymer sample at 400× is shown in FIG. 11 and may be compared with the microscope picture of a polymer sample comprising 30% titanium dioxide and 10% Abril 1041 wax in FIG. 10. It is seen that a much more uniform distribution of the titanium dioxide particles and no visual coarse spots are obtained in the sample containing the PGPR dispersing agent.

Figure 12:
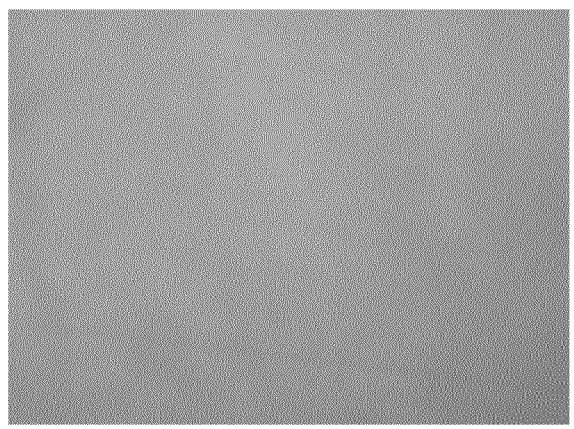
FIG. 12: LLDPE with 50% Kronos 2220 and 10% PGPR Palsgaard 4150.

A sample containing a high load of titanium dioxide particles, i.e. 50%, and PGPR dispersing agent was also prepared and is shown in FIG. 12. It is seen that a very uniform colored film is obtained and it is concluded that colored polymer compositions having a high load of titanium dioxide can be prepared when using the PGPR as dispersing agent.

Figure 13:
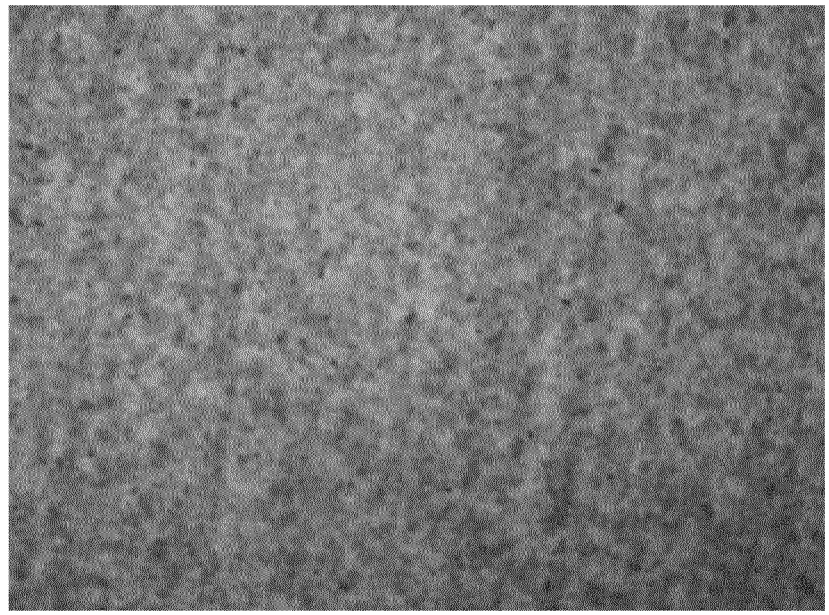
FIG. 13: LLDPE with 30% Magnapearl 2000 and 10% Abril 1041 wax.
Figure 14:
FIG. 14: LLDPE with 30% Magnapearl 2000 and 10% PGPR Palsgaard 4150.

A polymer sample comprising 30% Magnapearl pigment 2000 and 10% PGPR was also prepared and compared with a reference sample comprising 10% Abril 1041 wax as dispersing agent instead of PGPR. The microscope pictures are shown in FIGS. 13 and 14, respectively. The microscope examination showed that the presence of PGPR resulted in a more uniform distribution with a significant lower number of coarse pigment particles which appear as dark spots in the picture.

The invention claimed is:

1. A masterbatch for coloring of thermoplastic polymer compositions, the masterbatch comprising:
    a colorant in a total amount of 10-50% (w/w) relative to the total weight of the masterbatch,
    a dispersing agent in a total amount of 0.5-20% (w/w) relative to the total weight of the masterbatch,
    a carrier resin in a total amount of 30-80% (w/w) relative to the total weight of the masterbatch, and
    optionally, one or more additives,
    wherein the dispersing agent is a polyol poly(hydroxyl fatty acid) ester (pphe dispersing agent) wherein the pphe dispersing agent is poly(glycerol) poly(ricinoleate) ester (PGPR) in which the esterified poly(ricinoleate) of the PGPR has an average degree of polymerization of at least 5 and in which the esterified polyglycerol of the PG PR has an average degree of polymerization of 2-5.

2. The masterbatch according to claim 1, wherein the total amount of pphe dispersing agent in the masterbatch is 3-10% (w/w) relative to the total weight of the masterbatch.

3. The masterbatch according to claim 1, wherein the colorant is a pigment composition comprising organic, metalorganic and/or inorganic particles, where said particles are insoluble in polymers.

4. The masterbatch according to claim 1, wherein the total amount of colorant in the masterbatch is 20-50% (w/w) relative to the total weight of the masterbatch.

5. The masterbatch according to claim 1, wherein the carrier resin is selected from the group consisting of polyolefins, acrylic resins, styrene polymers, polycarbonates, polyamides, polyesters, thermoplastic polyurethanes, polyether sulphones, polysulphones, vinyl polymers and mixtures of the same.

6. The masterbatch according to claim 1, wherein the total amount of carrier resin in the masterbatch is 40-60% (w/w) relative to the total weight of the masterbatch.

7. The masterbatch according to claim 1, wherein the one or more additive(s) are selected from the group consisting of ultraviolet light absorbers, light stabilizers, antioxidants, flame-retardants, antibacterial agents, surface tension reducers, deodorizing agents, anti-static agents, anti-blocking agents, plasticizer agents, blowing agents, fillers, internal mold release agents and slip agents.

8. A method for producing the masterbatch according to claim 1, the method comprising the steps of:
    a) providing the dispersing agent, the colorant, the carrier resin and optionally one or more additive(s), and
    b) mixing the pphe dispersing agent, the colorant, the carrier resin and additives, if any, so as to form the masterbatch.

9. The method according to claim 8, the method further comprising the step of converting the masterbatch mixture obtained in step b) into granulate or pellets.

10. A colored thermoplastic polymer composition comprising the masterbatch according to claim 1 and one or more thermoplastic polymer(s).

11. The colored thermoplastic polymer composition according to claim 10, wherein the thermoplastic polymer is selected from the group consisting of polyolefins, acrylic resins, styrene polymers, polycarbonates, polyamides, polyesters, thermoplastic polyurethanes, polyether sulphones, polysulphones, vinyl polymers and mixtures of these.

12. The colored thermoplastic polymer composition of claim 10, wherein the composition is formed as a sheet, film, tube, bottle, container, molded product or other molded articles.

13. A method for producing a colored thermoplastic product, the method comprising the steps of:
    i) providing the masterbatch according to claim 1 and one or more thermoplastic polymer(s),
    ii) mixing the masterbatch and said one or more thermoplastic polymer(s), so as to form a colored thermoplastic polymer composition, and
    iii) processing the colored thermoplastic polymer composition obtained in step ii) into a desired shape so as to form the colored thermoplastic product.

* * * * *